(12) United States Patent
Kimoto

(10) Patent No.: US 8,553,273 B2
(45) Date of Patent: Oct. 8, 2013

(54) METHOD AND APPARATUS FOR POSTER PRINTING INCLUDING MARGINS, OVERLAP AREAS AND GLUING

(75) Inventor: Taichiro Kimoto, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 712 days.

(21) Appl. No.: 12/749,901

(22) Filed: Mar. 30, 2010

(65) Prior Publication Data

US 2011/0051195 A1 Mar. 3, 2011

(30) Foreign Application Priority Data

Aug. 31, 2009 (JP) ................................ 2009-199267

(51) Int. Cl.
*G06K 15/00* (2006.01)
(52) U.S. Cl.
USPC ............ 358/1.18; 347/16; 358/1.13; 358/1.2; 382/282; 382/286; 382/293
(58) Field of Classification Search
USPC .................... 358/1.15, 1.13, 1.18, 1.2; 101/2; 345/619; 347/101, 16; 382/282, 286, 382/293; 400/76; 434/365
See application file for complete search history.

(56) References Cited

U.S. PATENT DOCUMENTS

| | | | | |
|---|---|---|---|---|
| 5,517,587 A * | 5/1996 | Baker et al. | .................... | 382/296 |
| 5,596,352 A * | 1/1997 | Bliss et al. | ....................... | 347/15 |
| 6,507,411 B1 | 1/2003 | Nishikawa et al. | | |
| 2003/0202211 A1 | 10/2003 | Yudasaka et al. | | |
| 2004/0013455 A1 | 1/2004 | Matsuyama | | |
| 2005/0052662 A1 * | 3/2005 | Nishikawa et al. | ............. | 358/1.2 |
| 2005/0157134 A1 * | 7/2005 | Noguchi et al. | ............... | 347/101 |
| 2005/0169650 A1 * | 8/2005 | Ito et al. | .......................... | 399/45 |
| 2005/0244603 A1 * | 11/2005 | Hodsdon et al. | ............. | 428/40.1 |
| 2005/0255441 A1 * | 11/2005 | Martin | .......................... | 434/365 |
| 2006/0033943 A1 * | 2/2006 | Yanagi | .......................... | 358/1.13 |
| 2006/0283343 A1 * | 12/2006 | Koyama et al. | ............... | 101/119 |
| 2007/0062086 A1 * | 3/2007 | Hamel et al. | .................... | 40/605 |
| 2008/0239397 A1 * | 10/2008 | Morikawa | .................... | 358/1.18 |

FOREIGN PATENT DOCUMENTS

| | | |
|---|---|---|
| JP | 04-335670 A | 11/1992 |
| JP | 2000-025277 | 1/2000 |
| JP | 2002-321422 | 11/2002 |

(Continued)

OTHER PUBLICATIONS

JP Office Action dtd May 10, 2011, JP Appln. 2009-199267, English translation.

*Primary Examiner* — King Poon
*Assistant Examiner* — David S Cammack
(74) *Attorney, Agent, or Firm* — Banner & Witcoff, Ltd.

(57) ABSTRACT

In the printing device, the image in the print data indicates a part of the original image. The printing unit prints a print image in the printing region on the recording sheets. Each printing region is assigned with at least one of a gluing region and a projecting region. The projecting region is a part of the printing region. The gluing region is on the recording sheet. One of two printing regions corresponding to two image regions partially overlaps with each other is assigned with the gluing region. The remaining printing region is assigned with the projecting region. An image corresponding to the projecting region corresponds to a part of image corresponding to the one of the two printing regions. The printing unit performs borderless printing with the image corresponding to the projecting region running off the recording sheet.

18 Claims, 10 Drawing Sheets

(56) References Cited

FOREIGN PATENT DOCUMENTS

| | | | |
|---|---|---|---|
| JP | 2004-098656 | 4/2004 | |
| JP | 2004-255725 A | 9/2004 | |
| JP | 2007-261105 A | 10/2007 | |
| JP | 2009-160734 A | 7/2009 | |
| KR | 2007-763139 | * 10/2007 | ............... B65D 5/00 |

* cited by examiner

FIG.7
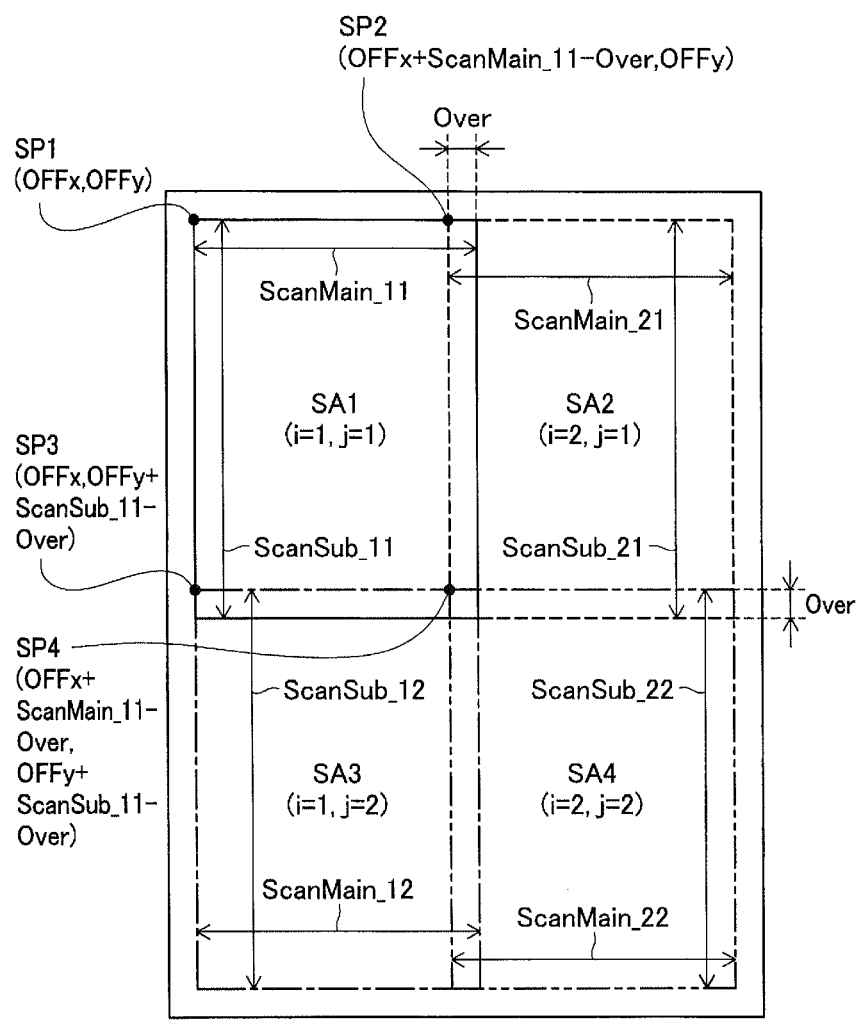
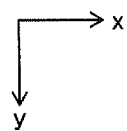

FIG. 9(A)

| PRINTING PAPER | PRINTING REGION | LENGTH OF PRINTING REGION | | GLUING AREA X, MARGIN AREA Y, AND PROJECTED AREA Z | | | |
|---|---|---|---|---|---|---|---|
| | | PrintMain_ij | PrintSub_ij | LEFT EDGE L | RIGHT EDGE R | UPPER EDGE U | DOWN EDGE D |
| PP1(i=1, j=1) | LA1 | 197.0 | 284.0 | 3.0 | 10.0 | 3.0 | 10.0 |
| PP2(i=2, j=1) | LA3 | 209.5 | 284.0 | -2.5 | 3.0 | 3.0 | 10.0 |
| PP3(i=1, j=2) | LA7 | 197.0 | 296.5 | 3.0 | 10.0 | -2.5 | 3.0 |
| PP4(i=2, j=2) | LA9 | 209.5 | 296.5 | -2.5 | 3.0 | -2.5 | 3.0 |

UNIT (mm)

FIG. 9(B)

| PRINTING PAPER | PRINTING REGION | ENLARGEMENT/REDUCTION-RATIO-DETERMINING-REGION | | GLUING AREA X, MARGIN AREA Y, AND PROJECTED AREA Z | | | |
|---|---|---|---|---|---|---|---|
| | | PrintMainKaku_ij | PrintSubKaku_ij | LEFT EDGE L | RIGHT EDGE R | UPPER EDGE U | DOWN EDGE D |
| PP1(i=1, j=1) | LA1 | 197.0 | 284.0 | 3.0 | 10.0 | 3.0 | 10.0 |
| PP2(i=2, j=1) | LA3 | 207.0 | 284.0 | 0.0 | 3.0 | 3.0 | 10.0 |
| PP3(i=1, j=2) | LA7 | 197.0 | 294.0 | 3.0 | 10.0 | 0.0 | 3.0 |
| PP4(i=2, j=2) | LA9 | 207.0 | 294.0 | 0.0 | 3.0 | 0.0 | 3.0 |

UNIT (mm)

FIG. 9(C)

| ENLARGEMENT/REDUCTION RATIO K(%) | CALCULATED SCANNING RANGE | | DIFFERENCE BETWEEN CALCULATED SCANNING RANGE AND MAXIMUM SCANNING RANGE | | DETERMINATION |
|---|---|---|---|---|---|
| | CalScanMain | CalScanSub | X-DIRECTION | Y-DIRECTION | |
| 199 | 203.0 | 290.5 | −1.0 | −0.5 | USE |
| 198 | 204.0 | 291.9 | 0.0 | +0.9 | NONUSE |
| 197 | 205.1 | 293.4 | +1.1 | +2.4 | NONUSE |

UNIT (mm)

FIG. 9(D)

| PRINT DATA | PRINTING REGION | ENLARGEMENT/REDUCTION RATIO K(%) | SCANNING RANGE | |
|---|---|---|---|---|
| | | | ScanMain_ij | ScanSub_ij |
| SA1(i=1, j=1) | LA1 | 199 | 99.0 | 142.7 |
| SA2(i=2, j=1) | LA3 | 199 | 105.3 | 142.7 |
| SA3(i=1, j=2) | LA7 | 199 | 99.0 | 149.0 |
| SA4(i=2, j=2) | LA9 | 199 | 105.3 | 149.0 |

UNIT (mm)

METHOD AND APPARATUS FOR POSTER PRINTING INCLUDING MARGINS, OVERLAP AREAS AND GLUING

CROSS REFERENCE TO RELATED APPLICATION

This application claims priority from Japanese Patent Application No. 2009-199267 filed Aug. 31, 2009. The entire content of the priority application is incorporated herein by reference.

TECHNICAL FIELD

The invention relates to a printing device capable of simplifying the printing of posters.

BACKGROUND

Some printers or printing systems well known in the art have been provided with a function for producing output larger than the maximum size of a sheet of paper that the printer can print. This function, referred to as a poster printing function, divides the print data for one large page among a plurality of sheets of paper that, when printed, can be pieced together to form a larger printed material.

SUMMARY

However, printing posters without using a borderless print function will leave white space along the peripheral edges of the sheets. Consequently, the user must trim the white edges using scissors or the like before piecing the sheets together to form a large poster-sized printed material.

In order to attain the above and other objects, the invention provides a printing device. The printing device includes a printing region setting unit, an image region setting unit, a print data generating unit, and a printing unit. The printing region setting unit sets a plurality of printing regions. The size of each printing region is set based on a size of a recording sheet. The image region setting unit sets a plurality of image regions for an original image. The plurality of image regions has one-to-one correspondence to the plurality of printing regions. Each image region is assigned with a position. At least two image regions partially overlap with each other. The print data generating unit generates a plurality of sets of print data each corresponding to one of the plurality of printing regions and indicating an image in the corresponding printing region. The image indicates a part of the original image. The printing unit prints a print image in the corresponding printing region on one of recording sheets based on each set of print data. Each printing region is assigned with at least one of a gluing region and a projecting region. The projecting region is a part of the printing region formed on an edge of the printing region and projects from an edge of the recording sheet. The gluing region is on the recording sheet and excluded from the printing region. One of two printing regions corresponding to two image regions partially overlaps with each other is assigned with the gluing region. The remaining one of the two printing regions is assigned with the projecting region, and an image corresponding to the projecting region of the remaining one of the two printing regions corresponds to a part of image corresponding to the one of the two printing regions. The printing unit performs borderless printing with the image corresponding to the projecting region running off the recording sheet.

According to another aspect, the present invention provides a computer-readable storage medium storing a set of program instructions executable on a computer, the program instructions includes setting a plurality of printing regions wherein a size of each printing region is set based on a size of a recording sheet, setting a plurality of image regions for an original image wherein the plurality of image regions has one-to-one correspondence to the plurality of printing regions, wherein each image region is assigned with a position, wherein at least two image regions partially overlaps with each other, generating a plurality of sets of print data each corresponding to one of the plurality of printing regions and indicating an image in the corresponding printing region, wherein the image indicating a part of the original image, and printing a print image in the corresponding printing region on one of recording sheets based on each set of print data. Each printing region is assigned with at least one of a gluing region and a projecting region. The projecting region is a part of the printing region formed on an edge of the printing region and projects from an edge of the recording sheet. The gluing region is on the recording sheet and excluded from the printing region. One of two printing regions corresponding to two image regions partially overlapping with each other is assigned with the gluing region, and a remaining one of the two printing regions is assigned with the projecting region, and an image corresponding to the projecting region of the remaining one of the two printing regions corresponds to a part of image corresponding to the one of the two printing regions. The printing performs borderless printing with the image corresponding to the projecting region running off the recording sheet.

BRIEF DESCRIPTION OF THE DRAWINGS

The particular features and advantages of the invention as well as other objects will become apparent from the following description taken in connection with the accompanying drawings, in which:

FIG. 7 is an explanatory diagram illustrating how scanning regions are defined based on an original document;

FIG. 9(A) is a table showing a result of calculation with respect to sizes print regions;

FIG. 9(B) is a table showing a result of calculation with printing region for determining enlargement/reduction ratios;

FIG. 9(C) is a table showing a result of calculation with respect to calculated scanning ranges; and FIG. 9(D) is a table showing a result of calculation with respect to enlargement/reduction ratios.

DETAILED DESCRIPTION

Figure 1:
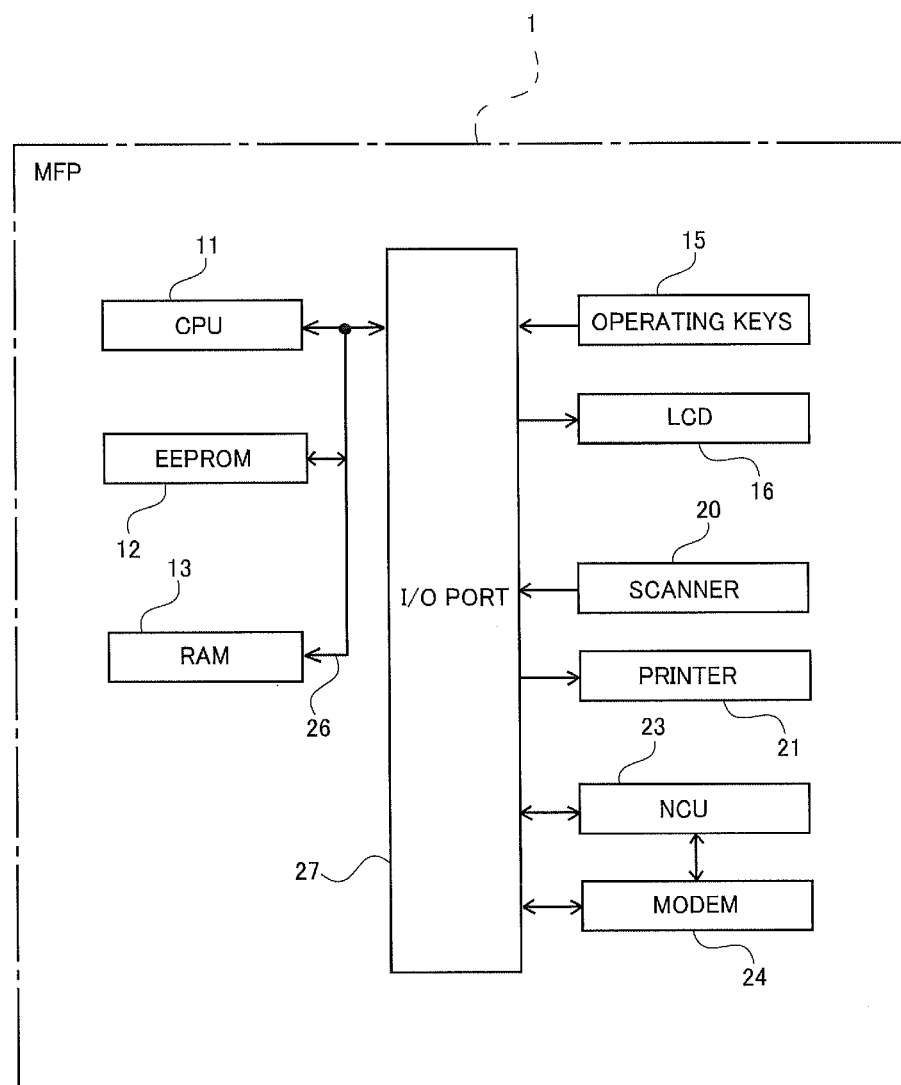
FIG. 1 is a block diagram illustrating an electrical structure of a multifunction peripheral.

A multifunction peripheral 1 (hereinafter, referred to as MFP 1) according to an embodiment of the invention will be described while referring to the accompanying drawings wherein like parts and components are designated by the same reference numerals to avoid duplicating description.

The MFP 1 of the embodiment possesses various functions, including a telephone function, a facsimile function, a printer function, a scanner function, and a copier function. In addition, the MFP 1 has a poster printing function for scanning a part of original image by a scanner 20 described later, generating print data by enlarging this scanned image, and printing an image on the sheet based on the print data. The MFP 1 repeats these processes in N×N times, and then N×N pages are printed. The poster is created by arranging N×N pages (i.e., N pages arranged vertically×N pages arranged horizontally, where N is a natural number greater than 0). In other words, the poster printing function can be used to produce output of a size greater than the largest sheet of paper that a printer 21 of the MFP 1 described later can print, by printing an image that indicates a part of image in the original document. The N×N printed sheets can be pieced together to form a large poster-sized material.

As shown in FIG. 1, the MFP 1 mainly includes a CPU 11, a EEPROM 12, a RAM 13, operating keys 15, an LCD 16, a scanner 20, the printer 21, a NCU 23, a modem 24. The CPU 11, the EEPROM 12, and the RAM 13 are interconnected via a bus line 26. The operating keys 15, the LCU 16, the scanner 20, the printer 21, the NCU 23, the modem 24, and the bus line 26 are interconnected via an input/output port 27.

The CPU 11 controls each function possessed by the MFP 1 and each component connected to the input/output port 27 based on fixed values and programs stored in the EEPROM 12 and the RAM 13, or various signals transmitted from or received by the NCU 23.

The EEPROM 12 is a nonvolatile memory device that allows stored data, such as, control programs executed by the CPU 11 and fixed values, to be overwritten. The EEPROM 12 stores a program that executes a poster printing process described below. The EEPROM 12 further stores a printing region table. Here, the printing region table defines printing regions LA1-LA9 (see FIG. 6).

The RAM 13 is a volatile memory device that allows stored data to be overwritten. The RAM 13 temporarily stores various data required in operations executed on the MFP 1. When the scanner 20 scans an original document placed in a prescribed scanning position (not shown), the scanned data generated by the scanner 20 is stored in the RAM 13. Print data described later that is acquired by the scanner 20 is also stored in the RAM 13 and is subsequently outputted to the printer 21.

The operating keys 15 include various buttons, such as numerical buttons for inputting a telephone number when using the facsimile function, and a power button for switching power to the MFP 1 on and off. The LCD 16 includes an LCD panel (not shown). The MFP 1 displays operation procedures and the status of current processes on the LCD panel. The scanner 20 primarily includes an image-reading unit for reading an original image and generating scanned data, and a platen glass on which the original document is placed. Thus, the scanner 20 is configured as a flatbed scanner that scans an image from the original document placed on the platen glass. In the embodiment, the maximum size of an original document that can be scanned on the flatbed scanner is the A4 size. The scanner 20 may also be provided with an automatic document feeder for feeding a plurality of sheets of an original document to be scanned. The printer 21 prints images on paper based on inputted print data for an image.

The NCU 23 is connected to a telephone network (not shown) and functions to control the transmission of dial signals to the telephone network and responses to call signals from the telephone network and to control the connection with an external device (not shown) connected to the telephone network. The modem 24 modulates image data designated for transmission by the facsimile function and transmits the modulated data via the NCU 23. The modem 24 also receives signals inputted via the NCU 23 and demodulates the signals to produce image data that can be recorded by the printer 21.

Next, the steps in the poster printing process will be described with reference to FIG. 2. The sheets of paper used for printing in the embodiment will be of the A4 size, where the length in the X-direction (main scanning direction) is 210 mm and the length in the Y-direction (sub scanning direction) is 297 mm.

In S1, the CPU 11 initializes variables i and j. These variables are used to select one sheet from among a plurality of sheets arranged in the N×N matrix. The variable i specifies the position of the sheet in the main scanning direction (X-direction), while the variable j specifies the position of the sheet in the sub scanning direction (Y-direction). Thus, in S1 the variables i and j are both initialized to "1".

Figure 8:
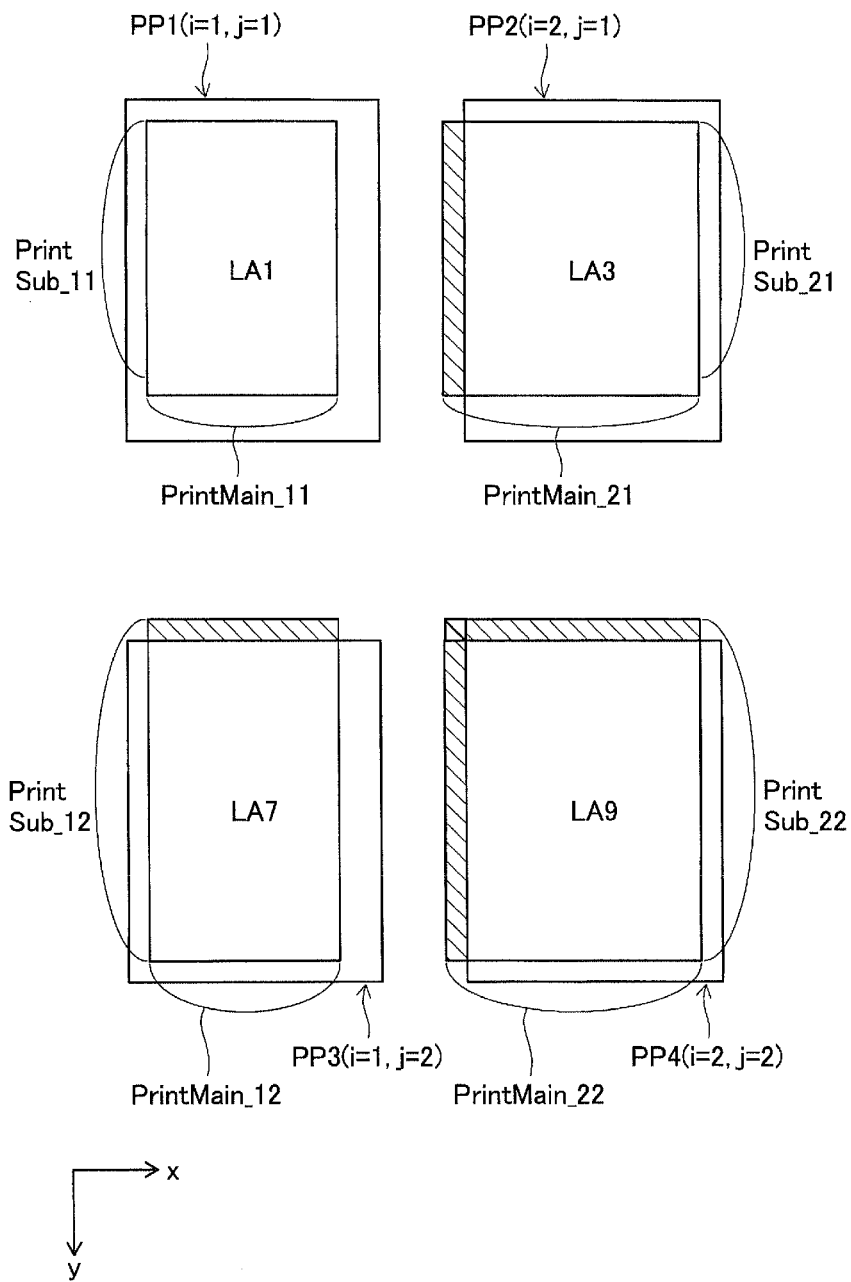
FIG. 8 is an explanatory diagram illustrating examples of printing regions.

In S3 the CPU 11 receives a size setting for the poster. The size setting is a number N indicating the number of sheets to be juxtaposed both vertically and horizontally. The user may be prompted to input this number N using the operating keys 15, for example. Based on the inputted number N, the CPU 11 can find the number of sheets required to create the poster by finding the product N×N. In the following example, it will be assumed that the number N is set to "2". That is, the poster to be printed will be configured of four sheets of printing paper arranged in a 2×2 matrix (2 pages arranged vertically and 2 pages arranged horizontally). In other words, the four sheets of printing paper will be arranged in a lattice form having 2×2 lattices. Accordingly, four sheets PP1 through PP4 arranged in a 2×2 matrix will be used to create the poster, as illustrated in FIG. 8.

Figure 6:
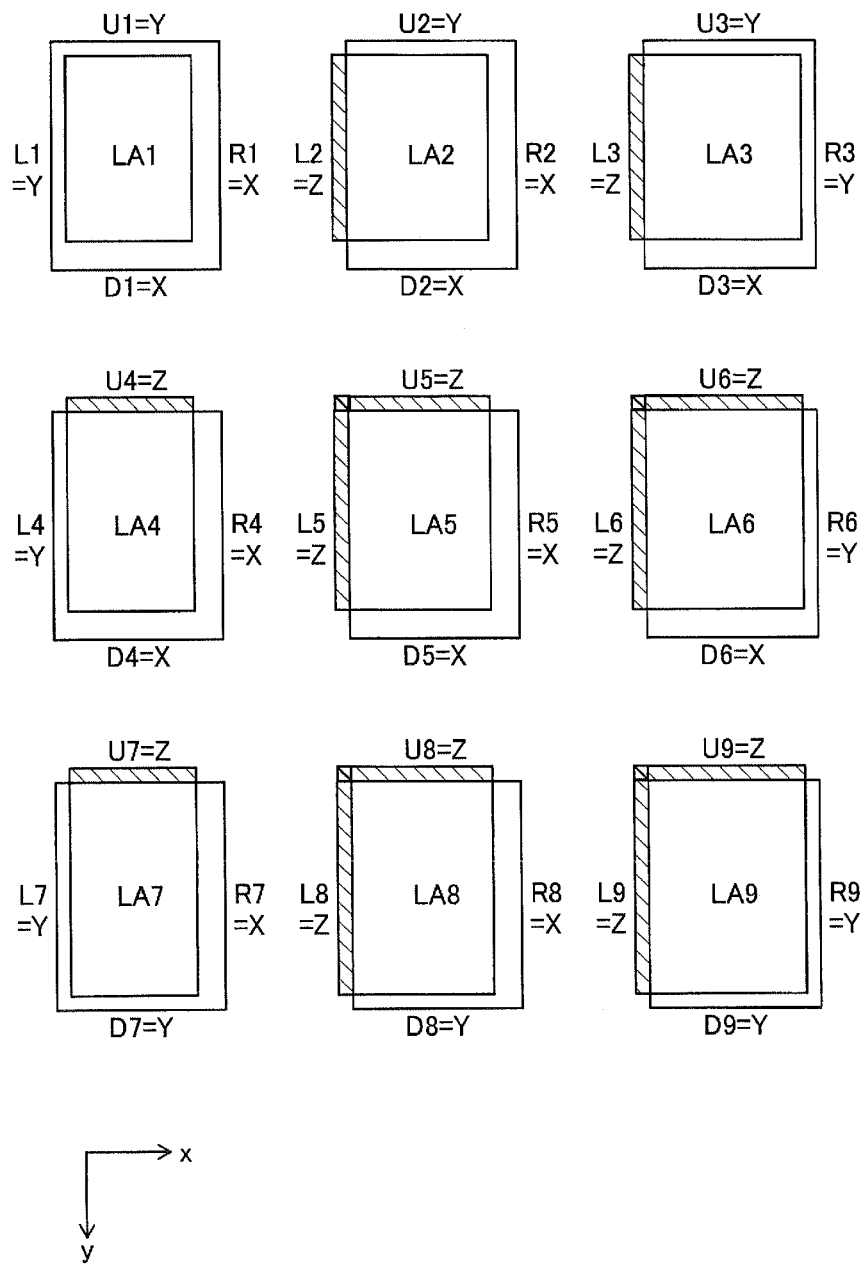
FIG. 6 is an explanatory diagram illustrating printing regions.

Next in S101, the CPU 11 sets a printing region for the current sheet by selecting one of predetermined printing regions LA1 to LA9 shown in FIG. 6. Here, the printing regions LA1 through LA9 will be described with reference to FIG. 6. Each sheet of paper has an upper edge, a down edge, a left edge, and a right edge. One of a gluing area X, a margin area Y, and a projected area Z is formed along each edge. The printing region is a region to print image and each edge of the printing region is assigned with one of the gluing area X, the margin area Y, and the projected area Z. The gluing area X and the margin area Y are areas on the printing paper but excluded from the printing region. The projected area Z is an area outside of the printing paper, but included in the printing region. Here, the configuration of the printing region has been determined by excluding the gluing areas X and the margin areas Y from an entire region of the printing paper and adding the projected areas Z.

The projected area Z will be described next in greater detail. When creating a poster, a plurality of sheets of paper must be pieced together so as to partially overlap each other. The bordering parts of sheets that overlap will be referred to as an overlapping part. An image formed on a sheet that is placed on top (near side) of a neighboring sheet in the overlapping part (i.e., a sheet that is joined later in the sequence) must be stretched to the edge of the top sheet. Accordingly, borderless printing is performed for the bordering part of this top sheet so that a part of an image printed on the top sheet (a part corresponding to the projected area Z) runs off the top sheet. In FIG. 6, areas of printing regions with hatching denote the projected areas Z, and parts of images corresponding to these areas are not printed on a sheet during borderless printing. In the embodiment, it will be assumed that the projected area Z has a width of 2.5 mm.

Next, the gluing area X will be described. The printing region assigned to a sheet that is positioned on the bottom (far side) of a neighboring sheet in the overlapping part (i.e., a sheet that is joined sooner in the sequence) is set so that a gluing area X is formed on each bordering part. The gluing area X has a width equivalent to the overlapping part, and no print data is assigned to the gluing area X and no image is formed in the gluing area X. In the present example, the gluing area X has a width of 10 mm.

Next, the margin area Y will be described. When a sheet has an edge corresponding to a peripheral edge of the original document, a margin area Y is formed between a printing region of the sheet and a corresponding edge of the sheet. In the embodiment, the margin area Y has a width of 3 mm No print data is assigned to the margin area Y and no image is formed in the margin area Y.

In the embodiment, each printing region is assigned with at least one of a gluing area X and a projected area Z. A configuration of the printing region with respect to assignment of the gluing area X and assignment of the projected area Z varies dependently on the position of the printing region. Each edge of the printing region is assigned with one of the margin area Y, the projected area Z, and the gluing area X.

In the printing processes (a normal printing process S73, a line printing process S89 described below), if the projected area Z projects from the left edge of the recording sheet, the CPU 11 sets an X-direction start position that is positioned outside the recording sheet from the left edge in the opposite direction of the X-direction by a length of the projected area Z in the X-direction. The CPU 11 performs borderless printing with respect to the left edge from the X-direction start position toward the X-direction. If the gluing area X is at the right edge of the recording sheet, the CPU 11 sets an X-direction end position that is positioned inside the recording sheet from the right edge in the opposite direction of the X-direction by a length of the gluing area X in the X-direction. The CPU 11 finishes printing the image at the X-direction end position. If the margin area Y is at the left edge of the recording sheet, the CPU 11 sets an X-direction start position that is positioned inside the recording sheet from the left edge in the X-direction by a length of the margin area Y in the X-direction. The CPU 11 prints an image from the X-direction start position toward the X-direction.

Further, if the projected area Z projects from the upper edge of the recording sheet, the CPU 11 sets a Y-direction start position that is positioned outside the recording sheet from the upper edge in the opposite direction of the Y-direction by a length of the projected area Z in the Y-direction. The CPU 11 performs borderless printing with respect to the upper edge from the Y-direction start position toward the Y-direction. If the gluing area X is at the down edge of the recording sheet, the CPU 11 sets a Y-direction end position that is positioned inside the recording sheet from the down edge in the opposite direction of the Y-direction by a length of the gluing area X in the Y-direction. The CPU 11 finishes printing the image at the Y-direction end position. If the margin area Y is at the upper edge of the recording sheet, the CPU 11 sets a Y-direction start position that is positioned inside the recording sheet from the upper edge in the Y-direction by a length of the margin area Y in the Y-direction. The CPU 11 prints an image from the Y-direction start position toward the Y-direction.

FIG. 6 shows nine patterns of the printing regions LA1-LA9. In the printing region LA1 of the example shown in FIG. 6, margin areas Y are formed on an upper edge U1 and a left edge L1, and gluing areas X are formed on a right edge R1 and a down edge D1. In the example of the printing region LA2, a projected area Z is formed on a left edge L2, a margin area Y is formed on an upper edge U2, and gluing areas X are formed on a right edge R2 and a down edge D2. In this way, gluing areas X, margin areas Y, and projected areas Z are formed in different combinations on edges of the printing regions LA1 through LA9. Thus, a poster is created by piecing together sheets having printing regions selected from the nine printing regions LA1 through LA9 in a prescribed order.

For example, when printing a poster having sheets arranged in a 2×2 matrix, the printing regions LA1, LA3, LA7, and LA9 are selected for respective sheets of the poster. These sheets are pieced together according to this order of selection after printing images in the corresponding printing regions LA1, LA3, LA7, and LA9 on the sheets. Thus, the layouts of the four printing regions used when N=2 are all different.

When printing a poster having sheets arranged in a 3×3 matrix, all nine printing regions LA1 through LA9 are selected for respective sheets, and the sheets are pieced together in this same order. The layouts of the nine printing regions used when N=3 are all different.

When printing a poster configured of sheets arranged in a 4×4 matrix, sixteen printing regions are selected from the printing regions LA1 through LA9 and are pieced together in the order LA1, LA2, LA2, LA3, LA4, LA5, LA5, LA6, LA4, LA5, LA5, LA6, LA7, LA8, LA8, and LA9.

When printing a poster configured of sheets arranged in a 5×5 matrix, twenty-five printing regions are selected from the nine printing regions LA1 through LA9 and are pieced together in the order LA1, LA2, LA2, LA2, LA3, LA4, LA5, LA5, LA5, LA6, LA4, LA5, LA5, LA5, LA6, LA4, LA5, LA5, LA5, LA6, LA7, LA8, LA8, LA8, and LA9.

Other variations may be used for the types of printing regions and the joining order required to create a poster. The printing regions shown in FIG. 6 are merely one example.

Steps in the process for determining the printing region in S101 of FIG. 2 will be described in detail with reference to FIG. 3.

Figure 3:
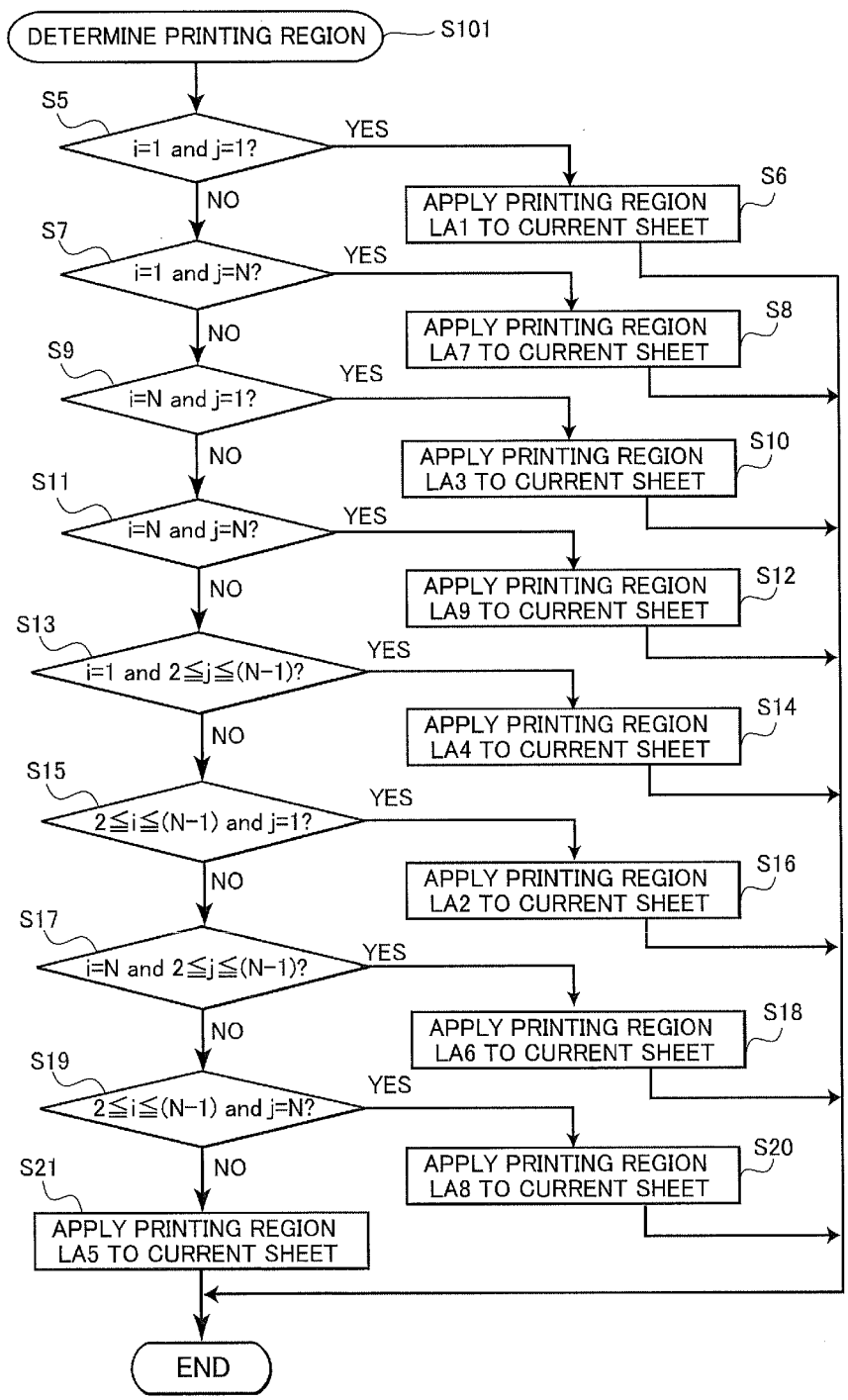
FIG. 3 is a flowchart determining printing regions.

In S5 through S21 of FIG. 3, the CPU 11 determines the printing region for the current sheet based on the position of the sheet in the matrix arrangement by referencing the printing region table (not shown) stored in the EEPROM 12. This printing region table defines correlations between the variables i and j and the printing regions LA1-LA9. Hence, by referencing the printing region table, the CPU 11 can determine which of the printing regions LA1 through LA9 to set for the current sheet.

In S5 the CPU 11 determines whether i=1 and j=1. If so (S5: YES), then in S6 the CPU 11 applies the printing region LA1 to the current sheet, and advances to S102 of FIG. 2. If not (S5: NO), in S7 the CPU 11 determines whether i=1 and j=N. If so (S7: YES), then in S8 the CPU 11 applies the printing region LA7 to the current sheet, and advances to S102 of FIG. 2. If not (S7: NO), in S9 the CPU 11 determines whether i=N and j=1. If so (S9: YES), in S10 the CPU 11 applies the printing region LA3 to the current sheet, and advances to S102 of FIG. 2. If not (S9: NO), in S11 the CPU 11 determines whether i=N and j=N. If so (S11: YES), then in S12 the CPU 11 applies the printing region LA9 to the current sheet, and advances to S102 of FIG. 2. If not (S11: NO), in S13 the CPU 11 determines whether i=1 and $2 \leq j \leq (N-1)$. If so (S13: YES), then in S14 the CPU 11 applies the printing region LA4 to the current sheet, and advances to S102 of FIG. 2. If not (S13: NO), in S15 the CPU 11 determines whether $2 \leq i \leq (N-1)$ and j=1. If so (S15: YES), then in S16 the CPU 11 applies the printing region LA2 to the current sheet, and advances to S102 of FIG. 2. If not (S15: NO), in S17 the CPU 11 determines whether i=N and 2≤j≤(N−1). If so (S17: YES), then in S18 the CPU 11 applies the printing region LA6 to the current sheet, and advances to S102 of FIG. 2. If not (S17: NO), in S19 the CPU 11 determines whether 2≤i≤(N−1) and j=N. If so (S19: YES), then in S20 the CPU 11 applies the printing region LA8 to the current sheet, and advances to S102 of FIG. 2.

If the CPU 11 reaches a negative determination in all of the above steps (S5-S19: NO), then in S21 the CPU 11 assumes that 2≤i≤(N−1) and 2<j<(N−1) and applies the LA5 to the current sheet. Subsequently, the CPU 11 advances to S102 of FIG. 2.

Since the poster being printed in the embodiment is configured of sheets arranged in a 2×2 matrix, the CPU 11 applies the printing region LA1 to the sheet PP1 (i=1, j=1) in S6, as shown in FIG. 8. Next, the CPU 11 applies the printing region LA3 to the sheet PP2 (i=2, j=1) in S10. Next, the CPU 11 applies the printing region LA7 to the sheet PP3 (1=1, j=2) in S8. Next, the CPU 11 applies the printing region LA9 to the sheet PP4 (i=2, j=2) in S12. Here, the number PP1-PP4 indicates the prescribed order in which the sheets are pieced together when creating the poster. In other words, the CPU 11 associates the printing region and the number (PP1-PP4) indicating the prescribed order.

Figure 2:
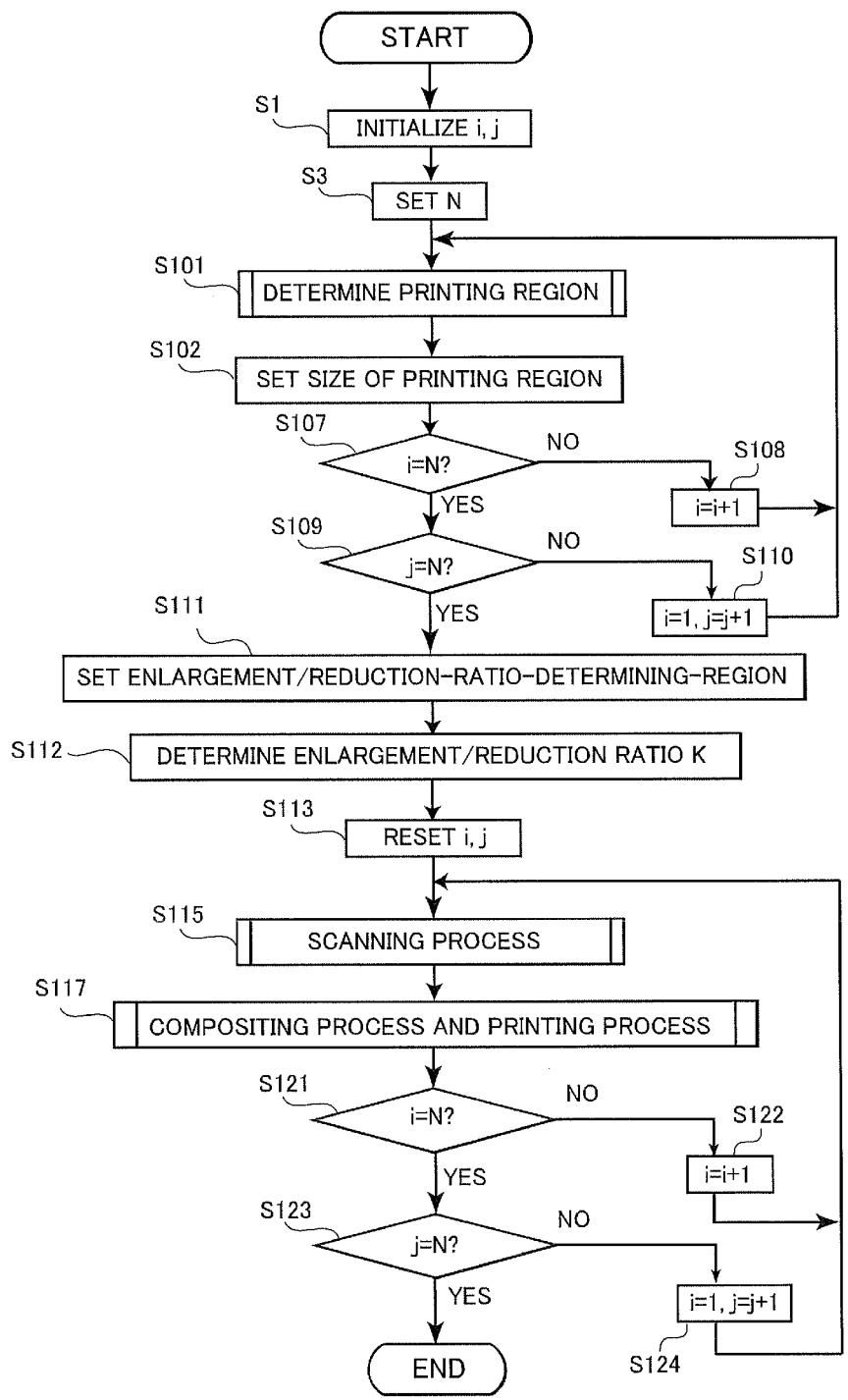
FIG. 2 is a flowchart illustrating processes of poster printing.

In S102 of FIG. 2 the CPU 11 sets the size of the printing region for the current sheet. Through a loop process performed in S107 and S109 described later, the CPU 11 sets the size of the printing region for each sheet one at a time. The printing region is set for each sheet in order to account for cases in which the configuration of the printing region differs among sheets. The size of the printing region is defined as a length PrintMain_ij of the printing region in the X-direction, which is the length of an edge of the printing region in the main scanning direction, and a length PrintSub_ij of the printing region in the Y-direction, which is the length of an edge of the printing region in the sub scanning direction. The description of this process in the embodiment will be generalized for all sheets using the variables i and j.

First, the method for finding the length PrintMain_ij of the printing region in the X-direction will be described. In the following description, PaperSizeMain denotes the length of the sheet in the X-direction (main scanning direction), and PaperSizeSub denotes the length of the sheet in the Y-direction (sub scanning direction). Specifically, the CPU 11 finds the length PrintMain_ij and the length PrintSub_ij by using following Equation (1) and (2), respectively:

$$PrintMain\_ij = PaperSizeMain - LX - LY + LZ \quad (1)$$

$$PrintSub\_ij = PaperSizeSub - LX - LY + LZ \quad (2)$$

Here, LX=(the width of the gluing area X), (10 mm, in the embodiment) if the gluing area X exists (that is, the gluing area X is assigned to the current printing region) whereas LX=0 mm if the gluing area X does not exist. LY=(the width of the margin area), (3 mm, in the embodiment) if the margin area Y exists (that is, the margin area Y is assigned to the current printing region) whereas LY=0 mm if the gluing area Y does not exist. LZ=(the width of the projected area Z), (2.5 mm, in the embodiment) if the projected area Z exists (that is, the projected area Z is assigned to the current printing region) whereas LZ=0 mm if the projected area Z does not exist. In the following description, LX, LY, and LZ have the values described here if not otherwise specified.

In this example, the poster is created with the sheets having the printing regions LA1, LA3, LA7, and LA9 shown in FIG. 8. Hence, the size of each printing region can be acquired using Equations (1) and (2), as illustrated in the table of FIG. 9(A).

In S107 the CPU 11 determines whether the variable i has reached the number N. If the variable i is still less than the number N (S107: NO), in S108 the CPU 11 increments the variable i by "1" and returns to S101. However, if the variable i has reached the number N (S107: YES), the CPU 11 advances to S109.

In S109 the CPU 11 determines whether the variable j has reached the number N. If the variable j is still less than the number N (S109: NO), in S110 the CPU 11 increments the variable j by "1", sets the variable i to 1, and returns to S101. However, if the variable j has reached the number N (S109: YES), the CPU 11 advances to S111.

By executing step S101 once each for each sheet of paper to be used in the matrix-shaped poster, the CPU 11 can determine the printing regions for all sheets.

In S111 the CPU 11 calculates the size of the enlargement/reduction-ratio-determining-region, and specifically an overall X-direction dimension PrintMainKaku of the enlargement/reduction-ratio-determining-region, and an overall Y-direction dimension PrintSubKaku of the enlargement/reduction-ratio-determining-region. The enlargement/reduction-ratio-determining-region is a printing region of the resultant poster configured of the all sheets pieced together and is a parameter used for finding the enlargement/reduction ratio K described later. Here, the projected areas Z are excluded from the enlargement/reduction-ratio-determining-region. The method of finding the enlargement/reduction-ratio-determining-region will be described here in greater detail. The overall X-direction dimension PrintMainKaku of the enlargement/reduction-ratio-determining-region is found by accumulating the X-direction dimension PrintMainKaku_lm for each sheet juxtaposed in the X-direction (l, m are natural number, in this example, 1, or 2). Similarly, the overall Y-direction dimension PrintSubKaku of the enlargement/reduction-ratio-determining-region is found by accumulating a Y-direction dimension PrintSubKaku_lm for each sheet juxtaposed in the Y-direction. The X-direction dimension PrintMainKaku_lm is expressed by Equation (3) below.

$$PrintMainKaku\_lm = PaperSizeMain - LX - LY \quad (3)$$

Similarly, the Y-direction dimension PrintSubKaku_1m is expressed by Equation (4) below.

$$PrintSubKaku\_lm = PaperSizeSub - LX - LY \quad (4)$$

That is, the CPU 11 calculates the X-direction dimension PrintMainKaku_lm and the Y-direction dimension PrintSubKaku_lm for each of the printing regions LA1, LA3, LA7, and LA9, as shown in FIG. 9(B). Consequently, the CPU 31 finds the overall X-direction dimension PrintMainKaku to be 197.0+207.0=404.0 mm by summing PrintMainKaku_1m and PrintMainKaku_2m (here, while summing PrintMainKaku_lm, m is fixed to one value of 1 and 2), and the overall Y-direction dimension PrintSubKaku to be 284.0+294.0=578.0 mm by summing PrintSubKaku_l1 and PrintSubKaku_l2 (here, while summing PrintSubKaku_lm, l is fixed to one value of 1 and 2).

In S112 the CPU 11 determines the enlargement/reduction ratio K. The enlargement/reduction ratio K is the ratio for the size of the poster relative to the size of the original document and is determined based on the ratio of the lengths of sides. In the embodiment, the original document is an A4 size. Hence, the theoretical value of enlargement/reduction ratio K when not considering the gluing areas Y is 200% when the poster being printed is configured of a 2×2 matrix, and 300% when the poster is configured of a 3×3 matrix. However, since the poster printed according to the invention has overlapping portions configured of the gluing areas Y, the enlargement/reduction ratio K will be smaller than the theoretical value.

Next, the method for determining the enlargement/reduction ratio K will be described. The enlargement/reduction ratio K is found based on a maximum scanning range of the scanner 20 and a calculated scanning range. The maximum scanning range denotes the maximum size of an original document that the scanner 20 can scan, and is defined by an X-direction maximum scanning range ScanMain and a Y-direction maximum scanning range ScanSub. The calculated scanning range denotes the area actually necessary for the scanner 20 to scan an original document and is defined by an X-direction calculated scanning range CalScanMain and a Y-direction calculated scanning range CalScanSub. The calculated scanning range is calculated from the enlargement/reduction-ratio-determining-region described above and the enlargement/reduction ratio K using Equations (5) and (6) below.

$$CalScanMain = PrintMainKaku/K \times 100 \qquad (5)$$

$$CalScanSub = PrintSubKaku/K \times 100 \qquad (6)$$

The value of the enlargement/reduction ratio K is set so that the calculated scanning range is as close as possible to the maximum scanning range without exceeding the maximum scanning range. If the calculated scanning range were to exceed the maximum scanning range, the scanning range would exceed the size of the original document.

The method for determining the enlargement/reduction ratio K of the embodiment is as follows. First, while varying the value of the enlargement/reduction ratio K, the MFP 1 calculates the calculated scanning ranges for an enlargement/reduction ratio K. Next, the CPU 11 compares each of the calculated scanning ranges to the maximum scanning range and selects one of the calculated scanning ranges closest to but not exceeding the maximum scanning range. Finally, the CPU 11 sets the enlargement/reduction ratio K to the value used in calculating the selected calculated scanning range.

Here, the method of setting the enlargement/reduction ratio K will be described using a specific example In this example, the maximum size of a sheet that the scanner 20 can scan is the A4 size, and the scanning range of the scanner 20 excludes 3 mm both vertically and horizontally along each peripheral edge of the original document. Thus, the X-direction maximum scanning range ScanMain will be equivalent to 210.0−3−3=204.0 mm, while the Y-direction maximum scanning range ScanSub will equal 297.0−3−3=291.0 mm.

Since the poster being printed in this example is configured of sheets arranged in a 2×2 matrix, the calculated scanning ranges will be calculated while varying the enlargement/reduction ratio K among arbitrary values less than or equal to 200%. In this example, the enlargement/reduction ratio K will be varied among the values 199%, 198%, and 197%. The results of computing the calculated scanning range for each of the above enlargement/reduction ratios K are shown in FIG. 9(C). As shown in FIG. 9(C), the calculated scanning range exceeds the maximum scanning range when the enlargement/reduction ratio K equals 197% and 198%, indicating that these values of enlargement/reduction ratio K are inappropriate. However, when the enlargement/reduction ratio K is set to 199%, a calculated scanning range closest to but not exceeding the maximum scanning range can be obtained. Accordingly, the value 199% is used for enlargement/reduction ratio K.

In S113, the CPU 11 resets both of the variables i and j to "1" and advances to S115.

Next, the CPU 11 executes a scanning process in S115 of FIG. 2. The scanning process sets a scanning range on the original document, scans the scanning range on the original document, and obtains print data by enlarging the size of an image in the scanned data. This process will be described in greater detail while referring to the flowchart in FIG. 4. Accordingly, one of two printing regions corresponding to two scanning range partially overlapping with each other is assigned with the gluing area X and a remaining one of the two printing regions is assigned with the projected area Z, and an image corresponding to the projected area Z of the remaining one of the two printing regions corresponds to a part of image corresponding to the one of the two printing regions. One of the two printing regions (assigned with the gluing area X) is assigned with a smaller order number (one of PP1-PP4, in the embodiment) than the remaining one of the two printing regions (assigned with the projected area Z).

Figure 4:
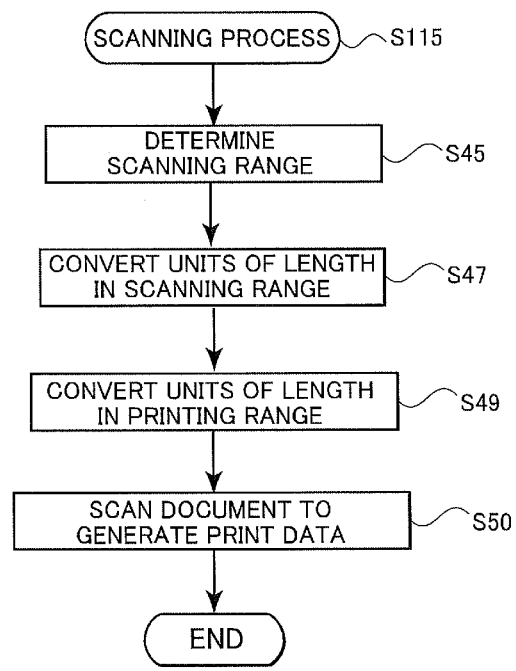
FIG. 4 is a flowchart illustrating a scanning process.

In S45 of FIG. 4, the CPU 11 determines a scanning range of the original document for the current sheet. The method for determining this range according to the embodiment will be described here. FIG. 7 is an explanatory diagram illustrating how scanning ranges SA1 through SA4 are defined on the original document. Each of the scanning ranges SA1 through SA4 corresponds to one of the sheets PP1 through PP4 shown in FIG. 8. The scanning ranges SA1-SA4 can be defined using a range size and two parameters indicating a range start position in the following manner.

The range size is defined by a length ScanMain_ij in the X-direction of the scanning range and a length ScanSub_ij in the Y-direction of the scanning range. The CPU 11 finds the length SeanMain_ij by dividing the length PrintMain_ij of the printing region of the current sheet (PP1-PP4) by the corresponding enlargement/reduction ratio K, as expressed in Equation (7) below.

$$ScanMain\_ij = PrintMain\_ij/K \times 100 \qquad (7)$$

Similarly, by using the length PrintSub_ij of the printing region of the current sheet (PP1-PP4) in the Y-direction, the length ScanSub_ij in the Y-direction of the scanning range is expressed in Equation (8) below.

$$ScanSub\_ij = PrintSub\_ij/K \times 100 \qquad (8)$$

Since the enlargement/reduction ratio K is equal to 199% in the example of the embodiment, the values shown in the table of FIG. 9(D) are found from Equations (7) and (8).

Next, the CPU 11 calculates an overlap size Over (FIG. 7). The overlap size Over is the size of the overlapping part corresponding to the projected area Z and is found from Equation (9) below.

$$Over = LZ/K \times 100 \qquad (9)$$

LZ=the width of the projected area Z (2.5 mm, in the embodiment).

Then, the CPU 11 sets the coordinates (x, y) of the range start position of the scanning range for the current sheet. The coordinates (x, y) of a range start position SP1 for the scanning range SA1 (for i=1 and j=1) are set to (OFFx, OFFy). The values for OFFx and OFFy are preset offset values indicating the corner of the maximum scanning range of the scanner 20, outside of which the scanner 20 does not scan. Accordingly, the scanning range SA1 is defined by a range in the X-direction from OFFx to (OFFx+ScanMain_11) and a range in the Y-direction from OFFy to (OFFy+ScanSub_11), as indicated by the solid lines in FIG. 7.

It is conceivable that the X coordinate for a range start position SP2 of the scanning range SA2 (for i=1 and j=2) is set to a numerical value for the width of the scanning range SA1 in the X-direction. However, since the projected area Z must also be taken into account, the CPU 11 performs a process to return the overlap size Over portion that is to be lost during a borderless print. Hence, the coordinates (x, y) of the range start position SP2 are set to (OFFx+ScanMain_11−Over, OFFy). Accordingly, the scanning range SA2 is defined by a range in the X-direction from (OFFx+ScanMain_11−Over) to (OFFx+ScanMain_11−Over+ScanMain_21) and a range in the Y-direction from OFFy to (OFFy+ScanSub_21), as indicated by the dotted lines in FIG. 7.

By using the overlap size Over in this way, the CPU 11 can form an overlapping part between the scanning ranges SA1 and SA2 to be redundantly scanned. In this way, a part of scanning range SA1 worth of the overlap size Over is included in the scanning range SA2 and the borderless printing is performed based on the scanning range SA2 for the projected area Z. Therefore, the CPU 11 can prevent a loss of print data equivalent to the projected area Z.

It is conceivable that the Y coordinate for a range start position SP3 of the scanning range SA3 (for i=2 and j=1) is normally set to a numerical value for the length of the scanning range SA1 in the Y-direction. However, the CPU 11 performs a process to return the overlap size Over portion that is to be lost during a borderless print. Hence, the coordinates (x, y) of the range start position SP3 are set to (OFFx, OFFy+ScanSub_11−Over). Accordingly, the scanning range SA3 is defined by a range in the X-direction from OFFx to (OFFx+ScanMain_12) and a range in the Y-direction from (OFFy+ScanSub_11−Over) to (OFFy+ScanSub_11−Over+ScanSub_12), as indicated by the line with alternating dots and dashes in FIG. 7.

As with the scanning ranges SA2 and SA3, the CPU 11 performs a process for the scanning range SA4 to return the overlap size Over portion. Accordingly, the scanning range SA4 is defined by a range in the X-direction from (OFFx+ScanMain_11−Over) to (OFFx+ScanMain_11−Over+ScanMain_22) and a range in the Y-direction from (OFFy+ScanSub_11−Over) to (OFFy+ScanSub_11−Over+ScanSub_22), as indicated by the line with alternating double dots and dashes in FIG. 7.

Returning to FIG. 4, in S47 the CPU 11 performs an operation to convert the units of the length ScanMain_ij and the length ScanSub_ij. More specifically, the CPU 11 converts the lengths from units of millimeters to units of pixels corresponding to a scanning resolution specified by the user. The scanning resolution is a value that determines the quality of data scanned by the scanner 20 and is defined by an X-direction scanning resolution RRx and a Y-direction scanning resolution RRy. The user may preset this scanning resolution. For example, the X-direction scanning resolution RRx may be set to 1200 dpi and the Y-direction scanning resolution RRy to 2400 dpi.

The CPU 11 converts the length ScanMain_ij to a length ScanMainPix_ij in the X-direction of the converted scanning range and the length ScanSub_ij to a length ScanSubPix_ij in the Y-direction of the converted scanning range according to Equations (10) and (11) below.

$$\text{ScanMainPix}\_ij = RRx \times \text{ScanMain}\_ij/25.4 \tag{10}$$

$$\text{ScanSubPix}\_ij = RRy \times \text{ScanSub}\_ij/25.4 \tag{11}$$

In S49 the CPU 11 performs an operation to convert the units for the length PrintMain_ij and the length PrintSub_ij. More specifically, the CPU 11 converts the lengths from units of millimeters to units of pixels corresponding to a printing resolution specified by the user. The printing resolution is a value that determines the printing quality and is defined by an X-direction printing resolution PRx and a Y-direction printing resolution PRy. The user may preset this printing resolution. The CPU 11 converts the length PrintMain_ij to a length PrintMainPix_ij in the X-direction of the converted printing region and the length PrintSub_ij to a length PrintSubPix_ij in the Y-direction of the converted printing region according to Equations (12) and (13) below.

$$\text{PrintMainPix}\_ij = PRx \times \text{PrintMain}\_ij/25.4 \tag{12}$$

$$\text{PrintSubPix}\_ij = PRy \times \text{PrintSub}\_ij/25.4 \tag{13}$$

In S50, the CPU 11 performs a scanning operation by controlling the scanner 20 to scan the scanning range in the original document using current values of ScanMainPix_ij and ScanSubPix_ij for current sheet and generates the print data for the current sheet by enlarging the size of the scanned image to the size of the printing region (or the size defined by PrintMainPix_ij and PrintSubPix_ij). In other words, the CPU 11 enlarges the scanned image by the enlargement/reduction ratio K/100.

Returning to the flowchart in FIG. 2, the CPU 11 advances to S117 and executes a compositing process and a printing process.

Figure 5:
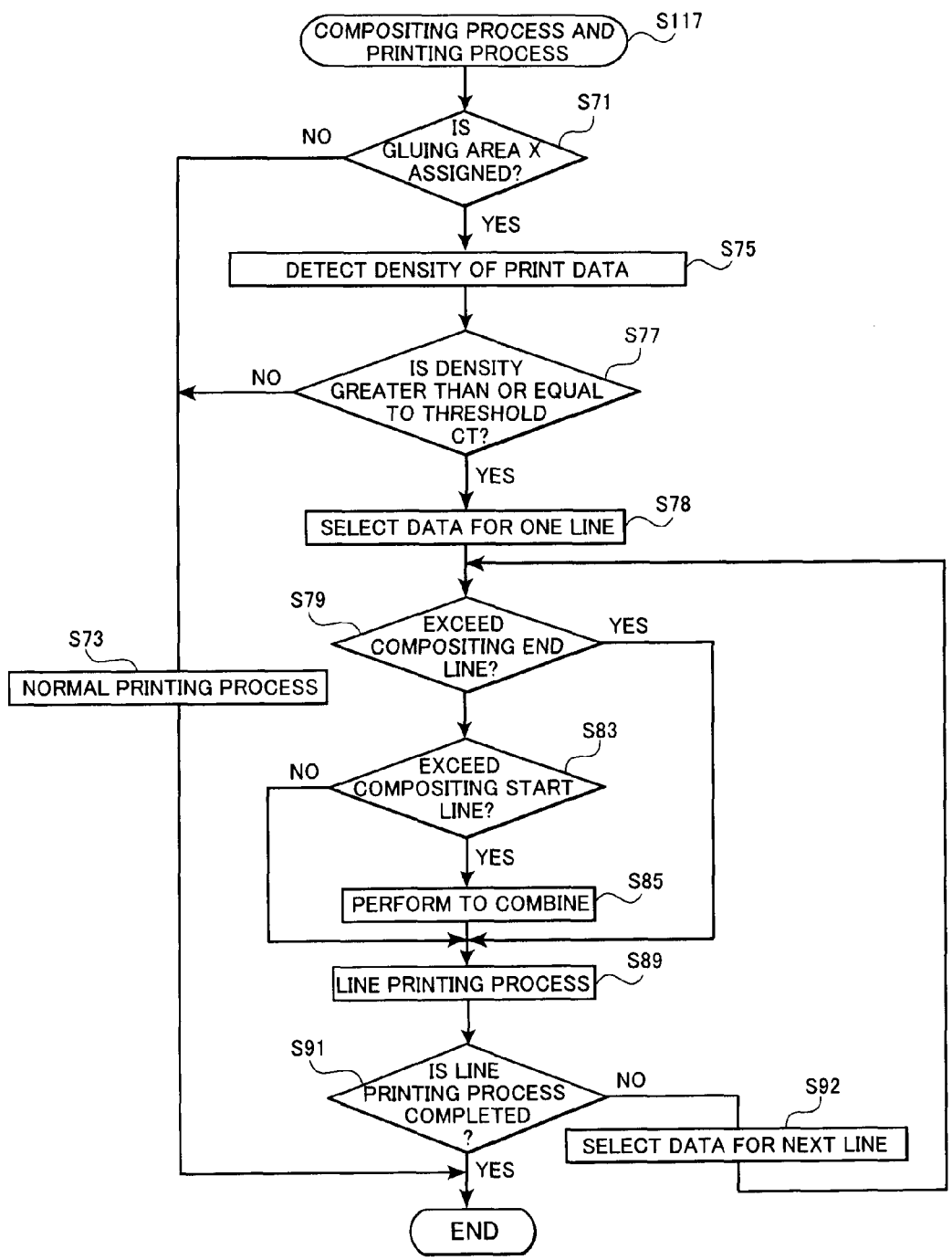
FIG. 5 is a flowchart illustrating a compositing process and a printing process.

The compositing process and printing process of S117 will be described here with reference to FIG. 5. In S71 of FIG. 5, the CPU 11 determines whether the printing region assigned to the current sheet is assigned with a gluing area X. If a negative determination is made in S71 (S71: NO), in S73 the CPU 11 performs a normal printing process to print the print data and returns to the flowchart in FIG. 2. However, if a positive determination is made in S71 (S71: YES), the CPU 11 advances to S75.

In S75 the CPU 11 performs an operation to detect the density of the print data in a region adjacent to the gluing area X. In S77 the CPU 11 determines whether the density of the print data detected in S75 is greater than or equal to a prescribed density threshold CT. If a negative determination is made in S77 (S77: NO), then the CPU 11 judges that the print data adjacent to the gluing area X has a sufficiently high density so that the border of the gluing area X can be visually detected without a glue line by the user. Accordingly, the CPU 11 advances to S73 to perform the normal printing process. However, if a positive determination is made in S77 (S77: YES), then the CPU 11 judges that the printing density near the gluing area X is so low as to approach the color of white paper and that the border between the printing region and the gluing area X cannot be visually confirmed without a glue line. Therefore, the CPU 11 advances to S78.

Steps S78 through S92 make up a glue line compositing process and a printing process. In these processes, the CPU 11 develops the print data into line data and controls the printing of this line data one line at a time. In S78 the CPU 11 selects data for one line, and in S79 determines whether the selected line data exceeds a prescribed compositing end line. If a positive determination is made in S79 (S79: YES), the CPU 11 advances to S89 to perform a line printing process for the selected line data for the selected line data without executing the glue line compositing process. However, the CPU 11 advances to S83 while determining that the compositing end line has not been exceeded (S79: NO). In S83 the CPU 11 determines whether the selected line data has surpassed a prescribed compositing start line. If a positive determination is made in S83 (S83: YES), in S85 the CPU 11 performs a process to acquire the address of the selected line data and to combine the selected line data with glue line data which has been developed into font data in advance. In S89 the CPU 11 executes the line printing process for the combined data. However, if a negative determination is made in S83 (S83: NO), the CPU 11 advances to S89 without executing the process in S85.

In S91 the CPU 11 determines whether the line printing process has been completed based on whether the last line data has been selected. If not (S91: NO), in S92 the CPU 11 selects data for the next line and returns to S79. However, if the positive determination is made (S91: YES), the CPU 11 ends the current process and returns to the flowchart of FIG. 2. Through this process, the CPU 11 can print a glue line in the line data included between the compositing start line and the compositing end line while sequentially printing line data one line at a time.

Specifically, the CPU 11 prints the glue line indicating the border between the gluing area X and the printing region when the print data adjacent to the region forming the gluing area X has a light density. This glue line enables the user to determine the gluing position for cases in which the border between the printing region and the gluing area X is difficult to ascertain because the printing density is low, such as in the case of text data on a white background.

After completing the process in S117, in S121 the CPU 11 determines whether the variable i has reached the number N. If not (S121: NO), in S122 the CPU 11 increments the variable i by "1" and returns to S115. On the other hand, if so (S121: YES), the CPU 11 advances to S123.

In S123 the CPU 11 determines whether the variable j has reached the number N. If not (S123: NO), in S124 the CPU 11 increments the variable j by "1", sets the variable i to "1", and returns to S115. The CPU 11 ends the current process upon determining that the variable j has reached the number N (S123: YES). Through the processes in S115 and S117, the CPU 11 prints all sheets of paper belonging to the matrix configuration of the poster one sheet at a time.

The steps S115 and S117 in the flowchart of FIG. 2 are repeated a number of times equivalent to the total number of sheets being printed (N×N times). Hence, each time a page worth of print data is read in S115, the printer 21 is controlled to print this print data on a sheet of paper in S117.

As described above, when a plurality of sheets are to be pieced together to form a poster by overlapping bordering parts of the sheets as overlapping parts, the MFP 1 according to the embodiment performs borderless printing for the bordering edges of sheets placed on top in the overlapping parts. Accordingly, the user need not trim these edges with scissors or the like, making the poster printing operation more user-friendly. Further, when sheets are overlapped in this way, the sheet positioned on the bottom in the overlapping part has a gluing area X to which print data has not been assigned. By assigning no print data in the gluing areas X, it is possible to avoid overlapping regions in which print data has been printed, thereby preventing the printing regions of overlapping parts from appearing darker.

The MFP 1 according to the embodiment can also determine whether to perform borderless printing in an overlapping part and whether to faun a gluing area X and a projected area Z in the overlapping part, based on the order in which the sheets will be pieced together. Accordingly, since the MFP 1 can perform borderless printing in overlapping parts and can form combinations of gluing areas X and projected areas Z, the MFP 1 eliminates the need to trim edges, enhancing user-friendliness.

Since a margin area Y is formed between the peripheral edge of the printing region and the edge of the printing paper, the MFP 1 according to the embodiment prevents borderless printing on the outer edges of a poster being created. Hence, the MFP 1 can reliably print all print data.

The MFP 1 according to the embodiment controls the printer 21 to print data each time the scanner 20 scans the print data. Accordingly, the print data used for a printing operation can be deleted from the RAM 13 after the printer 21 has executed the printing operation, thereby conserving the amount of memory required for reading print data.

While the invention has been described in detail with reference to the embodiment thereof, it would be apparent to those skilled in the art that various changes and modifications may be made therein without departing from the spirit of the invention.

In the description of the process of FIG. 2 according to the embodiment, steps S115 and S117 are repeatedly executed N×N times. However, the order of these steps is not limited to that described in the embodiment. For example, the CPU 11 may generate N×N segments of print data in S115 and store the generated data in the RAM 13. Subsequently, the CPU 11 may print all N×N pages in S117. Consequently, the MFP 1 can perform the plurality of scanning operations with the scanner 20 in S115 as a whole, reducing the time required for printing the poster. Alternatively, the CPU 11 may perform the scanning operation for the entire document to generate image data indicating an entire image of the original document, and generates the plurality of sets of print data for each of the printing regions from the image data. Still alternatively, the MFP 1 may receive image data from an external device, such as, PC, and generates the plurality of sets of the print data from the received image data based on the scanning range described above. Here, if the received image does not include the region corresponding to OFFx and OFFy, OFFx and OFFy are set to zero.

In the description of the embodiment, the margin area Y has the same width (3 mm) in both the X- and Y-directions. Further, the gluing area X has the same width (10 mm) in both the X- and Y-directions. However, it should be apparent that the widths of both the margin area Y and the gluing area X may be varied in the X- and Y-directions.

In the embodiment described above, the MFP 1 executes the scanning process of S115 described in FIG. 2, but the invention is not limited to this configuration. For example, a personal computer (PC) may be used to perform the scanning process. In this case, the print data scanned by the scanner 20 would be transmitted to the PC, and the PC would generate the print data in an N×N matrix from the scanned data. Subsequently, the PC would transmit the print data back to the MFP 1.

In the poster printing operation of the embodiment, the sheets of paper configuring the poster are arranged in an N×N matrix. However, it should be apparent that sheets of paper configuring a poster may also be arranged in an N×M (where M is a natural number greater than 0, and N≠M) matrix. When using an N×M matrix to create a poster, the original image in some cases may become stretched in the vertical or horizontal direction.

What is claimed is:
1. A printing device comprising:
 a printing region setting unit configured to set a plurality of printing regions, a size of each printing region being set based on a size of a recording sheet;
 an image region setting unit configured to set a plurality of image regions for an original image, the plurality of image regions having one-to-one correspondence to the plurality of printing regions, each image region being assigned with a position, at least two image regions partially overlapping with each other;

a print data generating unit configured to generate a plurality of sets of print data each being assigned with one of the plurality of printing regions and indicating an image in the corresponding printing region, the image indicating a part of the original image;

a printing unit configured to print a print image in the corresponding printing region on one of recording sheets based on each set of print data; and a calculating unit configured to calculate a first length based on a length of the recording sheet in a first direction and to calculate a second length based on a length of the recording sheet in a second direction intersecting the first direction, wherein each printing region is assigned with at least one of a gluing region and a projecting region, the projecting region being a part of the printing region formed on an edge of the printing region and projecting from an edge of the recording sheet, the gluing region being on the recording sheet, excluded from the printing region, and not assigned with the print data, wherein one of two printing regions corresponding to two image regions partially overlapping with each other is assigned with the gluing region, and a remaining one of the two printing regions is assigned with the projecting region, and an image corresponding to the projecting region of the remaining one of the two printing regions corresponds to a part of an image corresponding to the one of the two printing regions, wherein the printing unit performs borderless printing with the image corresponding to the projecting region running off the recording sheet, wherein the printing region corresponding to the image region including an edge region is associated with a margin region that is on the recording sheet and excluded from the printing region, the edge region corresponding to at least part of a peripheral edge of the original image, wherein each of the printing regions has a first region edge and a second region edge with respect to the first direction and a third region edge and a fourth region edge with respect to the second direction, the first region edge opposing the second region edge, the third region edge opposing the fourth region edge, each of the first region edge, the second region edge, the third region edge and the fourth region edge being assigned with one of the margin region, the projecting region, and the gluing region, wherein the calculating unit obtains the first length by subtracting from the length of the recording sheet in the first direction a length of at least one of the margin region and the gluing region in the first direction if the at least one of the margin region and the gluing region is assigned to either one of the first region edge and the second region edge, and by adding to the length of the recording sheet a length of the projecting region in the first direction if the projecting region is assigned to one of the first region edge and the second region edge, wherein a length of the image region in the first direction is determined based on a length obtained by dividing the first length by a ratio determined from a size of a print image to be printed and a size of the original image, wherein the calculating unit obtains the second length by subtracting from the length of the recording sheet in the second direction a length of at least one of the margin region and the gluing region in the second direction if the at least one of the margin region and the gluing region is assigned to either one of the third region edge and the fourth region edge, and by adding to the length of the recording sheet a length of the projecting region in the second direction if the projecting region is assigned to one of the third region edge and the fourth region edge, and wherein a length of the image region in the second direction is determined based on a length obtained by dividing the second length by the ratio.

2. The printing device according to claim 1, wherein each of the plurality of image regions is assigned with the position indicating one of a plurality of lattices in a lattice form, wherein the printing region setting unit sets each printing region based on the position of the corresponding image region, and a configuration of the printing region with respect to assignment of the gluing region and assignment of the projecting region varies dependent on the position of the corresponding image region, wherein a size of the printing region is determined based on assignment of the gluing region and assignment of the projecting region.

3. The printing device according to claim 1, wherein each of the plurality of printing regions is assigned with a number, and wherein the one of the two printing regions is assigned with a smaller number than the remaining one of the two printing regions.

4. The printing device according to claim 1, wherein the recording sheet extends in a first direction and a second direction intersecting the first direction, the recording sheet having a first edge and a second edge with respect to the first direction, and a third edge and a fourth edge with respect to the second direction, the first edge opposing the second edge, the third edge opposing the fourth edge, wherein when the projecting region projects from the first edge to the first direction, the printing unit sets a first start position that is positioned outside the recording sheet from the first edge in the first direction by a length of the projecting region in the first direction, and performs borderless printing with respect to the first edge from the first start position toward an opposite direction of the first direction, wherein when the gluing region is on the second edge, the printing unit sets a first end position that is positioned inside the recording sheet from the second edge in the first direction by a length of the gluing region in the first direction, and finishes printing the image at the first end position, wherein when the projecting region projects from the third edge to the second direction, the printing unit sets a second start position that is positioned outside the recording sheet from the third edge in the second direction by a length of the projecting region in the second direction, and performs borderless printing with respect to the third edge from the second start position toward an opposite direction of the second direction, wherein when the gluing region is on the fourth edge, the printing unit sets a second end position that is positioned inside the recording sheet from the fourth edge in the second direction by a length of the gluing region in the second direction, and finishes printing the image at the second end position.

5. The printing device according to claim 1, wherein the recording sheet extends in a first direction and a second direction intersecting the first direction, the recording sheet having a first edge with respect to the first direction and a second edge with respect to the second direction, wherein when the margin region is on the first edge, the printing unit sets a first start position that is positioned inside the recording sheet from the first edge in an opposite direction of the first direction by a length of the margin region in the first direction, and prints an image from the first start position toward the opposite direction of the first direction, wherein when the margin region is on the second edge, the printing unit sets a second start position that is positioned inside the recording sheet from the second edge in an opposite direction of the second direction by a length of the margin region in the second direction, and prints an image from the second start position toward the opposite direction of the second direction.

6. The printing device according to claim 1, wherein the calculating unit calculates a total size of a plurality of print images to be printed on the recording sheets by summing sizes of parts of printing regions excluding the projecting regions for the printing regions juxtaposed according to the positions of the corresponding image regions, wherein the printing region setting unit sets the ratio to one value among candidate values, each candidate value satisfying a condition that a determination value obtained by dividing the total size by the each candidate value does not exceed the size of the original image, the one value being a candidate value that gives a maximum determination value among the candidate values.

7. The printing device according to claim 1, wherein the printing region setting unit includes a detecting unit that detects a density of an image in a detecting region in the printing region, the detecting region being adjacent to the gluing region, wherein when the density of the image in the printing region is thinner than a prescribed density, the printing unit draws a border line between the gluing region and the printing region on the recording sheet.

8. The printing device according to claim 1, wherein each of the plurality of image regions is assigned with the position indicating one of a plurality of lattices in an N×N lattice form, wherein each of the plurality of printing regions has a different configuration with respect to assignment of the projecting region and assignment of the gluing region from each other when N is equal to two or three.

9. The printing device according to claim 1, wherein the print data generating unit includes a scanner unit configured to scan each image region of the original image on an original to generate scanned data having a scanned image and generates the print data by enlarging the scanned image.

10. The printing device according to claim 1, wherein the print data generating unit extracts partial image data indicating a partial image in each image region from image data, and generates the plurality of sets of print data by enlarging a plurality of partial images.

11. A non-transitory computer-readable storage medium storing a set of program instructions executable on a computer, the program instructions, when executed by the computer, comprising:

setting a plurality of printing regions, a size of each printing region being set based on a size of a recording sheet;

setting a plurality of image regions for an original image, the plurality of image regions having one-to-one correspondence to the plurality of printing regions, each image region being assigned with a position, at least two image regions partially overlapping with each other;

generating a plurality of sets of print data each being assigned with one of the plurality of printing regions and indicating an image in the corresponding printing region, the image indicating a part of the original image;

printing a print image in the corresponding printing region on one of recording sheets based on each set of print data; and calculating a first length based on a length of the recording sheet in a first direction and a second length based on a length of the recording sheet in a second direction intersecting the first direction, wherein each printing region is assigned with at least one of a gluing region and a projecting region, the projecting region being a part of the printing region formed on an edge of the printing region and projecting from an edge of the recording sheet, the gluing region being on the recording sheet, excluded from the printing region, and not assigned with the print data, wherein one of two printing regions corresponding to two image regions partially overlapping with each other is assigned with the gluing region, and a remaining one of the two printing regions is assigned with the projecting region, and an image corresponding to the projecting region of the remaining one of the two printing regions corresponds to a part of an image corresponding to the one of the two printing regions, wherein the printing performs borderless printing with the image corresponding to the projecting region running off the recording sheet, wherein the printing region corresponding to the image region including an edge region is associated with a margin region that is on the recording sheet and excluded from the printing region, the edge region corresponding to at least part of a peripheral edge of the original image, wherein each of the printing regions has a first region edge and a second region edge with respect to the first direction, and a third region edge and a fourth region edge with respect to the second direction, the first region edge opposing the second region edge, the third region edge opposing the fourth region edge, each of the first region edge, the second region edge, the third region edge and the fourth region edge being assigned with one of the margin region, the projecting region, and the gluing region, wherein the calculating includes obtaining the first length by subtracting from the length of the recording sheet in the first direction a length of at least one of the margin region and the gluing region in the first direction if the at least one of the margin region and the gluing region is assigned to either one of the first region edge and the second region edge, and by adding to the length of the recording sheet a length of the projecting region in the first direction if the projecting region is assigned to one of the first region edge and the second region edge, wherein a length of the image region in the first direction is determined based on a length obtained by dividing the first length by a ratio determined from a size of a print image to be printed and a size of the original image, wherein the calculating includes obtaining the second length by subtracting from the length of the recording sheet in the second direction a length of at least one of the margin region and the gluing region in the second direction if the at least one of the margin region and the gluing region is assigned to either one of the third region edge and the fourth region edge, and by adding to the length of the recording sheet a length of the projecting region in the second direction if the projecting region is assigned to one of the third region edge and the fourth region edge, and wherein a length of the image region in the second direction is determined based on a length obtained by dividing the second length by the ratio.

12. A printing device comprising:
a processing unit;
memory having executable instructions stored thereon that, when executed by the processing unit, cause the printing device to perform operations comprising:
setting a plurality of printing regions, a size of each printing region being set based on a size of a recording sheet;
setting a plurality of image regions for an original image, the plurality of image regions having one-to-one correspondence to the plurality of printing regions, each image region being assigned with a position, at least two image regions partially overlapping with each other;
generating a plurality of sets of print data each being assigned with one of the plurality of printing regions and indicating an image in the corresponding printing region, the image indicating a part of the original image;
printing a print image in the corresponding printing region on one of recording sheets based on each set of print data; and
calculating a first length based on a length of the recording sheet in a first direction and a second length based on a length of the recording sheet in a second direction intersecting the first direction, wherein each printing region is assigned with at least one of a gluing region and a projecting region, the projecting region being a part of the printing region formed on an edge of the printing region and projecting from an edge of the recording sheet, the gluing region being on the recording sheet, excluded from the printing region, and not assigned with the print data, wherein one of two printing regions corresponding to two image regions partially overlapping with each other is assigned with the gluing region, and a remaining one of the two printing regions is assigned with the projecting region, and an image corresponding to the projecting region of the remaining one of the two printing regions corresponds to a part of an image corresponding to the one of the two printing regions, wherein the printing device performs borderless printing with the image corresponding to the projecting region running off the recording sheet, wherein the printing region corresponding to the image region including an edge region is associated with a margin region that is on the recording sheet and excluded from the printing region, the edge region corresponding to at least part of a peripheral edge of the original image, wherein each of the printing regions has a first region edge and a second region edge with respect to the first direction, and a third region edge and a fourth region edge with respect to the second direction, the first region edge opposing the second region edge, the third region edge opposing the fourth region edge, each of the first region edge, the second region edge, the third region edge and the fourth region edge being assigned with one of the margin region, the projecting region, and the gluing region, wherein the calculating operation includes obtaining the first length by subtracting from the length of the recording sheet in the first direction a length of at least one of the margin region and the gluing region in the first direction if the at least one of the margin region and the gluing region is assigned to either one of the first region edge and the second region edge, and by adding to the length of the recording sheet a length of the projecting region in the first direction if the projecting region is assigned to one of the first region edge and the second region edge, wherein a length of the image region in the first direction is determined based on a length obtained by dividing the first length by a ratio determined from a size of a print image to be printed and a size of the original image, wherein the calculating operation includes obtaining the second length by subtracting from the length of the recording sheet in the second direction a length of at least one of the margin region and the gluing region in the second direction if the at least one of the margin region and the gluing region is assigned to either one of the third region edge and the fourth region edge, and by adding to the length of the recording sheet a length of the projecting region in the second direction if the projecting region is assigned to one of the third region edge and the fourth region edge, and wherein a length of the image region in the second direction is determined based on a length obtained by dividing the second length by the ratio.

13. The printing device according to claim 12, wherein the setting operation setting a plurality of printing regions includes detecting a density of an image in a detecting region in the printing region, the detecting region being adjacent to the gluing region, and when the density of the image in the printing region is thinner than a prescribed density, the instructions, when executed by the processing unit, further causing the printing device to perform operations including drawing a border line between the gluing region and the printing region on the recording sheet.

14. The printing device according to claim 12, wherein each of the plurality of image regions is assigned with the position indicating one of a plurality of lattices in a lattice form,
wherein the setting operation setting a plurality of printing regions sets each printing region based on the position of the corresponding image region, and a configuration of the printing region with respect to assignment of the gluing region and assignment of the projecting region varies dependent on the position of the corresponding image region,
wherein a size of the printing region is determined based on assignment of the gluing region and assignment of the projecting region.

15. The printing device according to claim 12, wherein each of the plurality of printing regions is assigned with a number, and the one of the two printing regions is assigned with a smaller number than the remaining one of the two printing regions.

16. The printing device according to claim 12, wherein the recording sheet extends in a first direction and a second direction intersecting the first direction, the recording sheet having a first edge and a second edge with respect to the first direction, and a third edge and a fourth edge with respect to the second direction, the first edge opposing the second edge, the third edge opposing the fourth edge,
wherein when the projecting region projects from the first edge to the first direction, the printing operation includes setting a first start position that is positioned outside the recording sheet from the first edge in the first direction by a length of the projecting region in the first direction, and performing borderless printing with respect to the first edge from the first start position toward an opposite direction of the first direction, wherein when the gluing region is on the second edge, the printing operation setting a first end position that is positioned inside the recording sheet from the second edge in the first direction by a length of the gluing region in the first direction, and finishing printing the image at the first end position, wherein when the projecting region projects from the third edge to the second direction, the printing operation setting a second start position that is positioned outside the recording sheet from the third edge in the second direction by a length of the projecting region in the second direction, and performing borderless printing with respect to the third edge from the second start position toward an opposite direction of the second direction, wherein when the gluing region is on the fourth edge, the printing operation setting a second end position that is positioned inside the recording sheet from the fourth edge in the second direction by a length of the gluing region in the second direction, and finishing printing the image at the second end position.

17. The printing device according to claim 12, wherein the printing region corresponding to the image region including an edge region is associated with a margin region that is on the recording sheet and excluded from the printing region, the edge region corresponding to at least part of a peripheral edge of the original image.

18. The printing device according to claim 17, wherein the recording sheet extends in a first direction and a second direction intersecting the first direction, the recording sheet having a first edge with respect to the first direction and a second edge with respect to the second direction, wherein when the margin region is on the first edge, the printing operation setting a first start position that is positioned inside the recording sheet from the first edge in an opposite direction of the first direction by a length of the margin region in the first direction, and printing an image from the first start position toward the opposite direction of the first direction, wherein when the margin region is on the second edge, the printing operation setting a second start position that is positioned inside the recording sheet from the second edge in an opposite direction of the second direction by a length of the margin region in the second direction, and printing an image from the second start position toward the opposite direction of the second direction.

* * * * *